US012595340B1

(12) United States Patent　　　　　　(10) Patent No.:　US 12,595,340 B1

Seidner et al.　　　　　　　　　　　　　(45) Date of Patent:　　　Apr. 7, 2026

(54) AMMONIA TREATMENT OF DENSIFIABLE CELLULOSIC BIOMASS FEEDSTOCK

(71) Applicants:Marc Allen Seidner, Los Angeles, CA (US); Daniel Jakob Seidner, Houston, TX (US)

(72) Inventors: Marc Allen Seidner, Los Angeles, CA (US); Daniel Jakob Seidner, Houston, TX (US)

(73) Assignee: Permanente Corp., Los Angeles, CA (US)

( * ) Notice: Subject to any disclaimer, the term of this patent is extended or adjusted under 35 U.S.C. 154(b) by 0 days.

(21) Appl. No.: 19/272,405

(22) Filed: Jul. 17, 2025

Related U.S. Application Data

(60) Provisional application No. 63/649,281, filed on May 17, 2024.

(51) Int. Cl.
| | |
|---|---|
| *C08H 8/00* | (2010.01) |
| *B01J 6/00* | (2006.01) |
| *B01J 8/08* | (2006.01) |
| *B27D 1/08* | (2006.01) |
| *C08J 5/12* | (2006.01) |
| *C10B 53/02* | (2006.01) |
| *C10B 57/00* | (2006.01) |

(52) U.S. Cl.
CPC ............... *C08H 8/00* (2013.01); *B01J 6/008* (2013.01); *B01J 8/085* (2013.01); *B27D 1/08* (2013.01); *C08J 5/12* (2013.01); *C10B 53/02* (2013.01); *C10B 57/005* (2013.01); *C08J 2397/02* (2013.01)

(58) Field of Classification Search
CPC .. C08H 8/00; B01J 6/008; B01J 8/085; B27D 1/08; C08J 5/12; C08J 2397/02; C10B 53/02; C10B 57/005

USPC .......................................................... 530/500
See application file for complete search history.

(56) References Cited

U.S. PATENT DOCUMENTS

2017/0107478 A1 * 4/2017 Harmon ................... F23J 15/02
2018/0258190 A1 * 9/2018 Balan ...................... C12P 19/14

FOREIGN PATENT DOCUMENTS

| CN | 1063070 A | * | 7/1992 | |
|---|---|---|---|---|
| CN | 218212203 U | * | 1/2023 | |
| TW | 200817625 A | * | 4/2008 | ............... F17C 1/02 |

OTHER PUBLICATIONS

Li, CN 1063070 A machine translation in English, Jul. 29, 1992. (Year: 1992).*
Gao et al., CN 218212203 U machine translation in English, Jan. 3, 2023. (Year: 2023).*
Timm et al., TW 200817625 A machine translation in English, Apr. 16, 2008. (Year: 2008).*

* cited by examiner

*Primary Examiner* — David T Karst
(74) *Attorney, Agent, or Firm* — Cherry Johnson Siegmund James PC

(57) ABSTRACT

In on example, a method of plasticizing at least a portion of lignin within a lignocellulosic biomass by mixing the biomass with anhydrous ammonia at a sub-ambient temperature and continuously conveying the mixture of lignocellulosic biomass and anhydrous ammonia through a reactor. At least a portion of the anhydrous ammonia is removed from the mixture. The lignocellulosic biomass having plasticized lignin is molded into a repeated shape.

22 Claims, 4 Drawing Sheets

AMMONIA TREATMENT OF DENSIFIABLE CELLULOSIC BIOMASS FEEDSTOCK

RELATED APPLICATION

The present application claims priority to U.S. Provisional Patent Application No. 63/649,281, titled "Densifiable Cellulosic Biomass Feedstock and Method of Continuous Formation Thereof by Anhydrous Ammonia Processing," filed May 17, 2024, which is hereby incorporated by reference in its entirety.

BACKGROUND

Increasing interest in renewable and sustainable resource alternatives has highlighted the potential of lignocellulosic biomass for producing fuels, materials, and chemical feedstocks. Lignocellulosic biomass can be derived from a variety of sources, such as, for example, agricultural residues, forest matter, aquatic vegetation, and so forth. Certain forms of biomass may be readily available and economically sourced, yet exhibit structural complexity that presents challenges for downstream processing. The inherent stability of certain lignocellulosic networks—including cellulose, hemicellulose, and lignin—can contribute to biomass rigidity but also can inhibit efficient thermal, chemical, and enzymatic conversion.

There is a need for processing methods that alter the internal bonding of lignocellulosic biomass to permit reshaping, densification, or component separation. Techniques that facilitate reformation or modification of the structure at a molecular level may allow such materials to be used in novel ways, including as moldable intermediates, carbon feedstocks, or high-density materials.

Disclosed herein are systems and methods for treating lignocellulosic biomass using ammonia-based chemistry, which may include cold immersion in anhydrous ammonia. The ammonia-based treatment affects the internal hydrogen bonding and lignocellulosic interactions within the biomass, enabling modification of its structural properties. Subsequent processing steps may include reshaping, densifying, or converting the treated biomass to yield new classes of feedstocks and product applications. The resultant material may be of particular use, for example, in energy, construction, or industrial applications.

SUMMARY

In on example, a method of plasticizing at least a portion of lignin within a lignocellulosic biomass by mixing the biomass with anhydrous ammonia at a sub-ambient temperature and continuously conveying the mixture of lignocellulosic biomass and anhydrous ammonia through a reactor. At least a portion of the anhydrous ammonia is removed from the mixture. The lignocellulosic biomass having plasticized lignin is molded into a repeated shape.

In another example, a product includes lignocellulosic biomass having lignin that has been plasticized by prior treatment with anhydrous ammonia at a sub-ambient temperature. The lignocellulosic biomass has a molded and densified structure formed by application of a compressive force to the lignocellulosic biomass having plasticized lignin.

In another example, a system includes an ammonia reactor, a separation system, a compression station, and a carbonization station. The ammonia reactor has an inner conduit configured to continuously convey a mixture of lignocellulosic biomass and liquid anhydrous ammonia for a dwell time sufficient to induce plasticization of lignin within the lignocellulosic biomass. The ammonia reactor also has an outer jacket and an outlet. The outer jacket surrounds the inner conduit and is configured to circulate a heat-transfer fluid that maintains the mixture at a sub-ambient temperature. The outlet is configured to discharge the mixture of lignocellulosic biomass having plasticized lignin. The compression station is configured to: receive the separated biomass output from the separation system, mold the separated biomass into a repeated shape while the bonding state remains chemically modified; and retain the separated biomass in the repeated shape at least until the bonding state no longer remains chemically modified by ammonia exposure. The carbonization station is configured to: receive the repeated shape output from the compression station; and subject the repeated shape output to thermal treatment under oxygen-limited conditions at a temperature between 350° C. and 850° C. The thermal treatment increases a fixed carbon fraction of the biomass.

BRIEF DESCRIPTION OF THE DRAWINGS

The same reference numbers or other reference designators are used in the drawings to designate the same or similar (functionally and/or structurally) features. The figures are not necessarily drawn to scale.

DETAILED DESCRIPTION

Disclosed herein are example systems and methods for modifying the structure of untreated, feedstock lignocellulosic biomass using ammonia-based chemistry (e.g., cold, anhydrous ammonia immersion) to enable reshaping, densification, or other further processing or use. The ammonia treatment may reform and improve the biomass to increase its strength or density through continuous formation processes. The ammonia treatment may also remove moisture and entrained gases from the biomass, thereby reducing weight, improving transport efficiency, and mitigating risks of microbial decay, spontaneous combustion, and degradation during storage. The ammonia treatment may be configured to induce permanent modifications to the biomass cellular structure, including plasticization of lignin; and this aspect may facilitate structural reformation processing (e.g., densification, compression, molding, shaping, reshaping, imprinting, etc.) for producing a wide variety of useful products, as described herein. The modified biomass may retain desirable physical and structural attributes introduced during ammonia treatment (e.g., densification, shape modification, etc.) in a durable manner. This stability reduces susceptibility to degradation mechanisms such as rotting, disintegration, decomposition, or premature combustion, thereby preserving the material's utility for subsequent processing or use. Certain examples facilitate cost-effective storage, transportation, and industrial utilization of processed biomass by transforming it into a less bulky and more manageable configuration without compromising its cellulosic value.

The processing disclosed herein may also facilitate selective alteration of the chemical and biological composition of the feedstock biomass, thereby facilitating the removal or recovery of specific extractives (e.g., hemicellulose, lignin, etc.) for subsequent use. One or more of these removed components may be further processed to make other feedstocks or other useful products, such as fuel products, as has been described herein. The modified material can also be treated at a controlled temperature in the absence of oxygen (pyrolysis) or chemically treated to create yet further new material. In some instances, the modified material is further carbonized in order to make new products (e.g., fuel products for use in metallurgy, such as bio-coal, bio-coke, biofuels, or other chemicals). Thus, the material output of example systems and methods disclosed herein may be of particular use, for example, in energy, construction, or industrial applications. These example advantages, among others, are described further below with reference to FIGS. 1-6.

Figure 1:
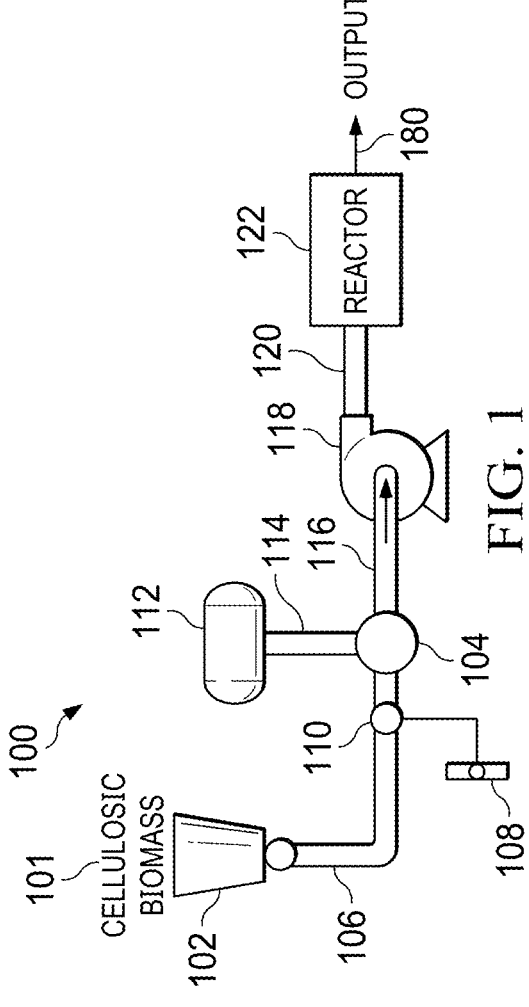
FIG. 1 is a graphical representation of a continuous system for ammonia treating biomass of the invention.

FIG. 1 is a graphical representation a system 100 for ammonia treating lignocellulosic biomass 101 according to one example. The system 100 includes a feed hopper 102 delivering lignocellulosic biomass 101 via a conduit 106 into a mixer 104, where it is combined with ammonia supplied from a tank 112 through a line 114. A vacuum pump 108 assists in removing entrained air and moisture through an airlock 110 upstream of mixing.

The exposure of the biomass 101 to ammonia initiates the structural transformation of the supplied biomass 101. The ammonia-immersed biomass 101 is propelled through conduit 116 using a mixer pump 118 and passed into an ammonia reactor 122 via conduit 120. The length of time a portion of the ammonia-biomass mixture 124 is treated within ammonia reactor 122 is referred to herein as the "dwell time."

In some examples, a continuous type of ammonia reactor 122 can be used. Examples of continuous ammonia reactors are disclosed in U.S. Pat. No. 10,961,459 "System for Production of Renewable Liquid Fuel" ("the '459 patent"), and in U.S. Pat. No. 11,345,860 "System and Method for Continuous Production of a Renewable Liquid Fuel ("the '860 patent"), the entire contents of which are expressly incorporated herein. As the word suggests, a "continuous" type of ammonia reactor 122 utilizes a continuous or near-continuous flow therethrough, wherein the ammonia-biomass mixture 124 is in constant or near-constant motion during the dwell time. As described further with reference to FIGS. 2 and 3, ammonia reactor 122 may include an inner pipe or conduit surrounded by an outer jacket or envelope. The cellulosic biomass is subjected to cold anhydrous ammonia treatment. In particular, the unprocessed cellulosic biomass 101 is mixed into a stream of ammonia (preferably anhydrous ammonia liquid) and will be flowed by positive displacement pumps and vacuum pumps through the inner pipe or conduit. During this dwell time the biomass in the inner pipe in anhydrous ammonia is subjected to a deep penetrating envelope of super cold liquid. The ammonia-treatment process of the ammonia reactor 122 is conducted in a controlled manner that does not subject the ammonia-biomass mixture 124 to high pressure treatment or to elevated temperatures.

Use of a continuous flow system may facilitate cost effective production at commercially viable volumes (e.g., in excess of tens of tons per hour throughput) and in a scalable and modular rate of processing. These aspects may provide improved outputs and adjustable processing speeds and temperatures and ammonia absorption based on biomass type, variety, moisture content, particle size and shape, and other conditions-far beyond anything currently available in any form of processing of bulk loose biomass.

While some examples describe ammonia reactor 122 as applying "continuous" ammonia-treatment processing or as being a "continuous" ammonia reactor 122, in some alternative examples, semi-continuous or batch systems is used. For example, in one alternative batch reactor, a volume of untreated biomass can be immersed in a tank of ammonia for a dwell time sufficient for the ammonia to permeate and treat the biomass, and after that time has passed, the now treated biomass can be removed for further processing. Some examples provide an integrated solution to challenges associated with harvested, collected, and aggregated biomass feedstocks, particularly those that are heterogeneous in composition or contain constituent components of varying sizes and types.

The starting or "feedstock" lignocellulosic biomass 101 can include a collection of low bulk density particles or discrete pieces composed primarily of cellulose in their native or natural density. These materials may exist as individual fragments, fibers, or segments that have not been substantially altered from their original physical form, and which collectively exhibit high volumetric occupancy relative to their mass.

Example material that may be used for biomass 101 includes bamboo, grasses, wood, wood fibers (e.g., in the form of chips, logging residue, logging slash, ground orchard wood, ground urban recycled wood and sawmill or milling waste, saw dust, shavings, chips, chunks, bark and hog fuel), agricultural fibers (e.g., in the form of wheat and rice straw, stover, stalks, nuts and seed shells, pits, hulls, corn stover, rice hulls, bagasse, cotton gin trash, or other suitable agricultural waste products), cellulosic water plants (such as water hyacinth and cattails), and in general, any other biomass materials, including combinations thereof, bound by a lignocellulosic structure.

Notably, certain feedstocks (e.g., rice and wheat straws) contain hollow cores that complicate their use in conventional panel or mat production due to poor resin uptake. The disclosed ammonia-based treatment, resulting in softening lignin both inside and outside such hollow structures, enables bonding and consolidation without the need for resins or additional mechanical modification.

In some examples, the feedstock biomass 101 is prepared to conform to certain maximum cross-sectional dimensions. This conformity may facilitate certain downstream processing. For example, the dwell time for certain reactors described herein may be controlled to between a few seconds for biomass 101 having a maximum 9 mm cross-sectional dimension. As another example, the dwell time for certain reactors described herein may be controlled to ten minutes for larger biomass 101 with maximum cross-sectional dimensions exceeding 50 mm but less than 75 mm.

Certain feedstock biomass 101 can be pristine, new materials grown for purpose of their use described herein. Additionally, or alternatively, certain feedstock biomass 101 may include waste materials that would otherwise have little to no value, or even significantly negative values, such as lignocellulosic water plant waste or undergrowth from rangelands and forests that contribute to pest habitats or serve as fuel for spreading wildfires. In particular, the use of invasive aquatic plants as lignocellulosic feedstock presents a compelling opportunity to transform an ecological burden into a productive input. These plants are typically fast-growing, highly cellulosic in composition, and proliferate in lakes, rivers, wetlands, and other water bodies, where they can outcompete native vegetation, degrade ecosystems, and interfere with recreational and commercial uses. Their aggressive growth and structural makeup make them well-suited for conversion through the processes described herein. Examples of such invasive aquatic plants include:

Eurasian Watermilfoil (*Myriophyllum spicatum*): Eurasian watermilfoil is a submerged aquatic plant that forms dense mats of vegetation, crowding out native species and impeding water navigation and recreation.

Water Hyacinth (*Eichhornia crassipes*): Water hyacinth is a floating aquatic plant known for its rapid growth. It can completely cover the surface of water bodies, reducing oxygen levels and sunlight penetration, which can harm aquatic life.

Giant *Salvinia* (*Salvinia molesta*): Giant *salvinia* is a free-floating aquatic fern that can double its biomass in a few days under ideal conditions. It creates thick mats on the water's surface, blocking sunlight and oxygen.

*Hydrilla* (*Hydrilla verticillata*): *Hydrilla* is a submerged aquatic plant that forms dense underwater mats, impeding water flow and navigation. It can also alter water chemistry and displace native aquatic plants.

Purple Loosestrife (*Lythrum salicaria*): Purple loosestrife is a wetland plant that invades wetlands and riparian areas, outcompeting native vegetation. It can alter the structure and function of wetland ecosystems.

Parrot's Feather (*Myriophyllum aquaticum*): Parrot's feather is a submerged aquatic plant that can grow rapidly, forming dense mats in aquatic environments. It can reduce water quality and affect native aquatic species.

Brazilian Waterweed (*Egeria densa*): Brazilian waterweed is a submerged aquatic plant that can grow quickly, interfering with water flow, recreation, and native aquatic ecosystems.

Water Chestnut (*Trapa natans*): Water chestnut is a floating aquatic plant with sharp, chestnut-like fruits. It forms dense mats on the water's surface, making it difficult for boats to navigate and disrupting native aquatic habitats.

Alligator Weed (*Alternanthera philoxeroides*): Alligator weed is a floating or emergent aquatic plant that can spread rapidly, displacing native vegetation and disrupting aquatic ecosystems.

*Phragmites* (*Phragmites australis*): *Phragmites*, also known as common reed, is a tall, aggressive wetland grass that can take over wetland areas, reducing habitat quality for native species.

Regardless of the type of lignocellulosic biomass 101 sourced as feedstock, when aggregated, the loose bulk can have a high cubic volume accompanied by a low dry basis weight bulk density. Depending on the nature of the biomass 101 used as feedstock, the bulk density may vary from a few pounds per cubic foot to fifteen to thirty pounds or per cubic foot. In the case of water plants, the weight is much higher and problems of decay, rotting, and infestation of the collected water plants with harmful snails, parasites, and pathogens is particularly vexatious.

Some alternative approaches attempt to prepare biomass feedstock for further processing by mechanically compressing or otherwise aggregating feedstock biomass into bales, chunks, or other discrete units, which can weigh as much as forty to fifty pounds per cubic foot. The mechanical compression of wood, for example, may involve pre-treating the wood by boiling it in water or steaming the wood, or boiling the cellulosic material in papermaking solutions such as aqueous lye, which softens the wood to allow it to be then compressed, molded, shaped, and imprinted at high pressure and elevated temperature. Such mechanical compression methods can be quite time consuming, particularly when processing anything other than small wood chips and saw-dust, and the excess water and chemicals absorbed during the process must be washed out and removed, which greatly slows the process down. Moreover, such processing can require considerable amounts of water.

Importantly, this type of mechanical compression may not result in a meaningful increase in the intrinsic density of the lignocellulosic material itself. Rather, it primarily displaces surface water or air. Mechanically compressed biomass in raw or minimally processed form remains prone to moisture absorption, swelling, and accelerated disintegration. It also can retain substantial interstitial voids filled with air, which introduces significant levels of oxygen and moisture both between particles and within the cellular structure of the biomass. These retained gases and water content can be undesirable for certain downstream processing or combustion, as they contribute to increased weight, elevated handling and transportation costs, and heightened risks of microbial decay, rotting, or even spontaneous combustion during storage. Additionally, the presence of entrained air facilitates further moisture absorption, and during thermal processing, this retained moisture can lead to undesirable polymerization reactions and generate unwanted byproducts such as $CO_2$ and $NO_x$. These effects can undermine the quality and economic value of the biomass as a feedstock for fuel or material conversion.

Ammonia is effective for loosening up and breaking the hydrogen bonds holding together the lignin, hemicellulose and cellulose that make up wood and other cellulosic biomass, which results in plasticization so that it can be further processed. For example, U.S. Pat. No. 3,282,313 to Schuerch discloses a method of forming wood (bending, pressing, shaping, shaving, and fibrillizing) that comprises first taking wood and placing it in an evacuated chamber and passing ammonia in the evacuated chamber to replace the air in the wood with ammonia, after which the wood is subjected to the action of anhydrous ammonia in a liquid or gaseous form at a pressure at least equal to the vapor pressure of liquid ammonia at the temperature of treatment. Schuerch discloses that in general, the amount of ammonia absorbed by the wood in the impregnation operation should be at least about 10% by weight of the dry wood in excess of the amount molecularly equivalent to the moisture content of the wood, and that immersing the wood in anhydrous ammonia plasticizes the wood, which can then be formed as desired. Schuerch postulates that the anhydrous ammonia is a strong hydrogen bonding, low molecular weight solvent which penetrates not only into the amorphous areas of the fiber cell wall but also into the crystal lattice of cellulose and into the phenolic lignin binding materials, and that some of the hydrogen bonds responsible for the rigidity of the wood are displaced by the ammonia, and that the resulting softening of the fiber structure permits molecules to slip by each other when subjected to moderate tension or compression or both. Schuerch postulates that as the ammonia evaporates, hydrogen bonds are again formed between the polymer chains but not necessarily at the same locations or between the same microfibrils, and the resultant hydrogen bonding cross links the wood structure which again becomes rigid. Schuerch discloses that no application of heat or excessive pressure is needed, and that the formed wood has no tendency to return to its original shape (spring back) after the ammonia evaporates. Schuerch also discloses that aqueous ammonia or gaseous ammonia at ordinary temperature and pressure are not as effective in the disclosed process as is anhydrous ammonia.

U.S. Pat. No. 4,606,388 to Favot describes a process to densify low density hardwoods by impregnating wood with ammonia gas by placing the wood in a sealed chamber and first evacuating it to a negative pressure of about one atmosphere, after which ammonia gas is added to the chamber and brought up to a pressure of about 100-150 psi (689-1034 kpa) for about 2-8 hours. Favot notes that wood treated with ammonia becomes plasticized. While Favot mentions anhydrous ammonia, no process separate from the process of using gaseous ammonia is described. After the appropriate time, the wood is removed from the chamber and is subjected to cyclic pressing cycles under heating of less than 100 degrees Celsius to compress the wood, remove the water, and absorb ammonia from the wood. After cyclic pressing, the wood is said to remain in its compressed state. Lastly, it is kiln dried to further reduce its water content. Favot describes the disclosed process as able to densify weaker species of hardwood, such a poplar, alder, cotton-wood, rubber tree and soft maple to bring them to similar or high levels of hardness, density, and strength as hardwood species like oak, hard maple, and birch. Favot notes that coniferous wood of high gum content such as pine, spruce and balsam are not suitable as staring materials, and that it is preferable to use only sapwood which is substantially free of any heartwood.

However, neither Schuerch and Favot disclose or even suggest that their respective processes can be used on raw unprocessed wood fiber, much less on other lignocellulosic biomass material that may be used as source feedstock in certain examples of the present disclosure (e.g., biomass waste from processing of forest products, bark, slash, saw-dust, shavings, chips and the like, including starting wood based materials other than wood planks and veneers, or on agricultural fibers such as bamboo, grasses, wheat and rice straw, soy stalks, nuts and seed shells, corn stover, rice hulls, sugar cane bagasse, cotton gin trash and the like, or on other high cellulosic materials such as water plants).

Nor do Schuerch and Favot disclose the possibility of using ammonia to help remove hemicellulose or lignin from the treated cellulosic biomass so that the hemicellulose can then be used as a feedstock for making biofuels including bioethanol, biodiesel, cellulosic ethanol, biobutanol, and biogas, and for use in other feedstocks or products. The enzymatic digestion of hemicellulose in cellulosic biomass to produce biofuels can be influenced by several factors that may interfere with or inhibit the process. For example, lignin can physically shield cellulose and hemicellulose from enzy-matic attack and can also irreversibly bind to enzymes, reducing their activity and availability for breaking down hemicellulose. Likewise, the presence of certain compounds in biomass, such as phenolic compounds, organic acids, and furans, can inhibit enzyme activity. These inhibitors are often released or formed during the pre-treatment of biomass by typical currently used processing methods. Also, the physical structure and particle size of the biomass can impact enzyme accessibility and larger particles, or more tightly packed biomass can limit enzyme access to hemi-cellulose. Anhydrous ammonia can be used to liberate hemicellulose and/or lignin from the cellulosic biomass so that it can be more effectively processed to make biofuels such as ethanol.

From a commercialization viewpoint, the processes described by Schuerch and Favot would be too slow and not suitable for large scale adoption and high scale production to make sufficient quantities of any products. The Schuerch and Favot examples relate to single pieces processed individu-ally at a time or at most in a small batch and seemingly in a pressurized sealed vessel such as an autoclave. There is no suggestion of anything that involves a continuous envelope emersion and penetration compression, densification, for-mation and ammonia evaporation process. Nor do Scheurch or Favot deal with subsequent processing within the overall cellulosic treatment for chemical extraction, by-products extraction or refining for biofuels, or the heat treatment of the wood through torrefaction or pyrolysis to produce car-bonized and pyrolyzed products and their by-products, including biochar, ash, vinegar and tars.

The inventor has previously developed systems and meth-ods for creating renewable green liquid fuels from cellulosic biomass, including in the incorporated '459 and '860 pat-ents. Among other teachings, the '459 and '860 patents disclose carbonization of cellulosic biomass. At least one differentiating aspect of the present disclosure is that the starting biomass feedstocks need not be heat or pressure pre-treated prior to the processing disclosed herein. Certain anhydrous ammonia processing, for example, may be man-aged and maintained by cold negative heat exchange in the ammonia reactor 122 using even colder coolants, including nitrogen, glycol, and similar chemical coolants to maintain the lower temperatures needed to process and penetrate the biomass moving through the reactors.

Lignin is a natural polymer found in all cellulosic bio-mass, along with hemicellulose and cellulose. These com-ponents are structurally bonded together in plant matter and behave similarly to synthetic polymers. Lignin plays a critical role as a binding agent, cementing individual plant cells and contributing to the mechanical strength of biomass. It is distributed throughout the cell wall but is primarily concentrated in the middle lamella and cell corners. Lignin content varies by biomass type—typically comprising 23% to 33% of the wood substance in softwoods and 16% to 25% in hardwoods—and is also found in agricultural residues such as straw, stover, seed pods, shells, and to a lesser extent, aquatic plants.

There are three primary categories of lignin, correspond-ing to grasses, softwoods, and hardwoods. Grasses such as rice, wheat, and corn typically contain "G-type" lignin, which is rich in guaiacyl (G) monomers and exhibits a relatively low degree of polymerization, making it more easily degradable. Softwoods such as pine, spruce, and fir also contain predominantly guaiacyl units, but their lignin tends to be more polymerized and more resistant to degra-dation than grass lignin. Hardwoods such as oak, maple, and cherry contain a mixture of guaiacyl (G) and syringyl(S) units—referred to as "G/S-type" lignin. Hardwood lignin is generally the most resistant to enzymatic degradation due to its higher degree of polymerization and the presence of syringyl units, which are more condensed and less reactive.

Regardless of its type or source, lignin is sensitive to moisture and temperature, which is why steam bending and steam heating have historically been used to modify its structure. However, as disclosed herein, lignin can also be chemically altered by exposure to ammonia. The ammonia-based processing described in this application is effective across lignin types and enables modification of biomass from diverse feedstocks for subsequent densification, reshaping, or biochemical conversion.

Returning to FIG. 1, the system 100 provides the option of foregoing mechanical pre-processing. Instead of compressing biomass mechanically prior to modification, system 100 enables initiating treatment by directly immersing raw or minimally processed biomass into a stream of ammonia at an early stage. This facilitates efficient permeation and softening without introducing excess air or water, thereby saving time, reducing water consumption, and improving process throughput.

After a sufficient dwell time in the ammonia reactor 122, which itself may have static mixers to continually move and mix the ammonia and biomass, the biomass (101) portion of the ammonia-biomass mixture 124 will become thoroughly permeated by ammonia. The dwell time can be influenced by the dimensions of the ammonia reactor 122 including its length, cross-sectional area, plus the speed at which the ammonia-cellulosic mixture 124 travels through the ammonia reactor 122. Once mixed, ammonia will act on the cellulosic biomass 124 to disrupt and weaken and plasticize the lignocellulosic bonds and hydrogen bonds holding the hemicellulose, lignin, and cellulose in the cellulosic biomass together. This ammonia treatment importantly also can aid in the removal of significant amounts of moisture, gasses (air, nitrogen, and oxygen), and extractives (e.g., various organic compounds including fats, waxes, resins, terpenes, and tannins that can be later extracted from biomass, for example, using solvents) from the cellulosic biomass and this will be further described below with respect to FIG. 4. The ammonia may, to some degree, also cause some cellulose, hemicellulose, and/or lignin to be liberated from the treated cellulosic biomass, and the liberated cellulose, hemicellulose, and/or lignin may be collected for further uses. For example, the freed cellulose could be further used for making biofuels by other known technologies, and the lignin can be collected and used for other purposes as has been described in this patent application.

Figures 2, 3:
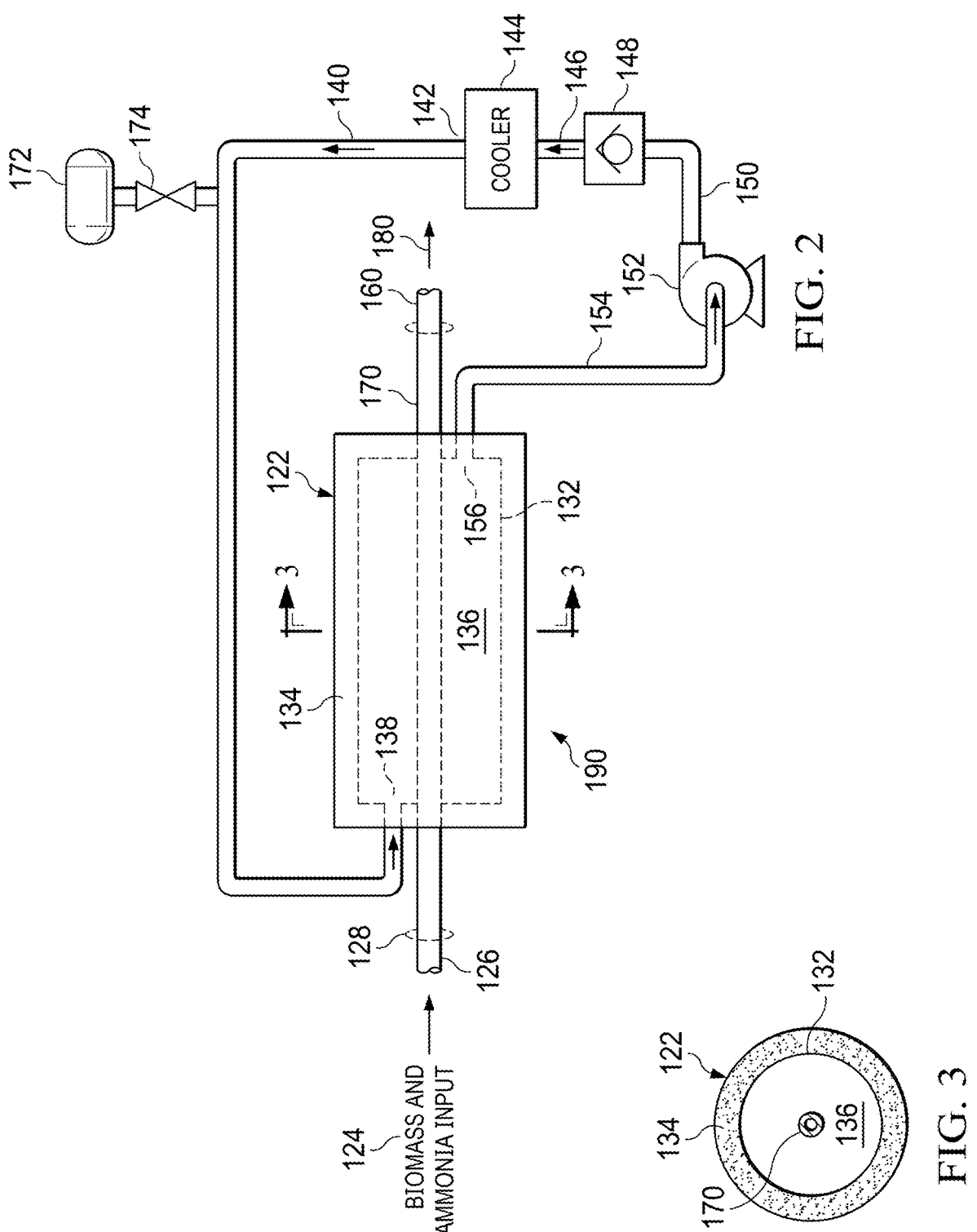
FIG. 2 is a graphical representation of an ammonia reactor of the continuous system for ammonia treating biomass of FIG. 1.
FIG. 3 is a cross-sectional view through view lines 3-3 of the ammonia reactor body of FIG. 2.

FIG. 2 is a graphical representation of the ammonia reactor 122 of system 100 of FIG. 1 according to one example. In this example, upstage from ammonia reactor 122, biomass 101 feedstocks (supplied from field hopper 102) and ammonia (supplied from tank 112) intermix together (as described with reference to FIG. 1), thereby forming the ammonia-biomass mixture 124. The ammonia reactor 122 receives the ammonia-cellulosic mixture 124 as input and facilitates deep ammonia penetration and permeation thereof.

The processing within ammonia reactor 122 causes hydrogen bond disruption within the lignocellulosic matrix, weakening the interactions between cellulose, hemicellulose, and lignin and thus causing plasticization. This aspect may facilitate structural modification processing (e.g., densification, compression, molding, shaping, reshaping, imprinting, etc.) for producing a wide variety of useful products, as described herein. The ammonia treatment also facilitates removal of moisture and entrained gases (e.g., oxygen, nitrogen, etc.) from the biomass, thereby reducing weight, improving transport efficiency, and mitigating risks of microbial decay, spontaneous combustion, and degradation during storage. In some examples, the ammonia-treatment processing of ammonia reactor 122 may be deemed a first reactor stage. As described further with reference to FIG. 6, in some examples, a first reactor stage performed at ammonia reactor 122 is distinguished from a second reactor stage performed at a carbonization station 402, at least in that carbonization or pyrolysis takes place only at the latter and not at the former.

Referring again to FIG. 2, the ammonia reactor 122 may be a collection of lengths of conduit (e.g., pipe) arranged in a stacked or radiator fashion and connected in a continuous linear fashion to allow for the movement of the cellulosic biomass that has been immersed in ammonia (124) for a sufficient time as desired to enable the lignin in the biomass to become weakened and plasticized. The ammonia reactor 122 includes an inner conduit 170 for conveying the ammonia-cellulosic mixture 124. The inner conduit has an input end 126 for receiving the biomass ammonia mixture 124 and an output end 160 for conveying the ammonia-treated biomass mixture 180. Respective one-way valves may be placed at the input end 126 and output end 160.

An outer jacket 132 surrounds inner conduit 170, with the outer jacket 132 and inner conduit 170 collectively forming part of a reactor body 190. The outer jacket 132 is adopted to enclose a circulating heat transfer fluid, as explained further below. The outer jacket 132 is preferably insulated with an insulation layer 134. The illustrated configuration may facilitate continuous cold treatment while maintaining ammonia in its liquid phase.

The preferred ammonia treatment method performed at ammonia reactor 112 involves the use of anhydrous ammonia supplied in liquid form and at a controlled cold temperature. The liquification temperature of anhydrous ammonia is −28.5 F (−33.6 C) at ambient pressure. It remains present at a liquid state at 10 bar at a temperature elevated to 77 F (25 C). It freezes at minus 108 F (−77.7 C).

One notable advantage of using anhydrous ammonia is its exceptional ability to saturate the lignin in the cellulosic biomass 101 and chemically alter the biomass structure. Anhydrous ammonia effectively plasticizes certain types of cellulosic biomass by weakening the hydrogen bonds that link lignin, hemicellulose, and cellulose, thereby facilitating subsequent compression, densification, and reshaping of the biomass while the ammonia remains present. Unlike traditional processes that rely on steam, high moisture content, or other chemical treatments, ammonia-treated biomass exhibits minimal "spring-back" or elastic recovery following compression. Once formed into a densified geometry, the treated biomass retains its modified shape with little to no re-expansion. Additionally, the ammonia-treated biomass tends to repel moisture, resist ignition and low-temperature combustion, deter pests and plant pathogens, and exhibit enhanced dimensional stability with reduced tendency to dissolve, disintegrate, or decompose. These effects may be achieved without the need for high compression pressures or prolonged dwell times under compression.

While anhydrous ammonia is preferred for certain applications due to its high reactivity and low moisture content, other forms of ammonia (e.g., ammonia gas, aqueous ammonia, ammonium hydroxide, etc.) may be used. The choice of ammonia form may affect process parameters, including the required dwell time within ammonia reactor 122, as well as the degree of plasticization, penetration depth, and moisture management during treatment.

In some examples, it may be desirable to consistently maintain low range of temperatures of the ammonia-biomass mixture 124 within ammonia reactor 112 to facilitate ammonia penetration and plasticization of the biomass portion. Among other technical advantages, operating the ammonia reactor 122 within a prescribed cold temperature range may counter the temperature effects of certain exothermic processing and also avoid having to maintain the ammonia-biomass mixture 124 under pressure.

Ammonia has a strong affinity for water due at least in part to the highly polar nature of both molecules. When ammonia comes into contact with raw, untreated cellulosic biomass 101, it seeks out and forms hydrogen bonds with the water molecules present within the biomass 101. The partial positive charge on the hydrogen atoms in ammonia interacts with the partial negative charge on the oxygen atom of water, and vice versa, resulting in the formation of a stable solution of ammonium hydroxide ($NH_4OH$), according to the reaction: $NH_3 + H_2O \rightarrow NH_4OH$. This mixing process is highly exothermic and releases significant heat.

To prevent the chemically generated heat from causing thermal overexpansion of the ammonia and potential rupture or "explosion" of the cellulosic fibers, and to maintain the ammonia-biomass mixture 124 at low, controlled temperature, a heat-transfer fluid may be circulated through the space defined between the inner conduit 170 and the outer jacket 132 of the ammonia reactor 122. The heat-transfer fluid can include any suitable cryogenic fluid, such as, for example, liquid nitrogen, liquid carbon dioxide, conventional refrigerants, chiller coolants (e.g., propylene glycol), anhydrous ammonia, or any other appropriate heat-transfer fluid. This heat-transfer fluid remains separate from the ammonia-biomass mixture 124 and is continuously recirculated and may be externally chilled to ensure a stable and consistent heat exchange. The flow of the supporting coolant is maintained by pumps (e.g., 108/208/308) and valves (e.g., 148/210/212/216) and monitored and controlled in conventional equipment control fashion. In operation, this configuration provides reliable negative thermal regulation through the walls of ammonia reactor 122, maintaining the desired low-temperature environment inside.

In some alternative examples, at least partial rupture or "explosion" of the cellulosic fibers may be a desired result. In some instances, the explosion of cellulosic fibers may allow valuable sugars and chemicals to be extracted without the impeding lignin bonds. This effect may be desired, for example, to improve the feedstock for use in producing bioethanol. Ammonia reactor 122 can be configured to use anhydrous ammonia at a low temperature and pressure to accomplish the desired "explosion," which can result in increased sugar yield and removal of undesirable lignin percentages in the feedstock in a cost-effective and continuous manner.

The heat transfer liquid will preferably be circulated by entering the space 136 at an inlet end 138 near the input end 128 of the inner conduit 170. At this point, the heat transfer liquid is the coldest. It will then pass through the space 136 towards an outlet end 156 which is near the output end 160 of the inner conduit 170. During the passage of the heat transfer liquid, it will pick up heat generated by the exothermic reaction of ammonia with water in the biomass taking place in the inner conduit 170.

The flow direction of the heat transfer liquid may be opposite of the flow direction of the biomass being ammonia treated as it passes through the inner conduit 170. The countercurrent flow of the heat transfer fluid may efficiently offset the exothermic interaction between ammonia and water entrained in the biomass, preventing excessive heating that could otherwise destabilize the treatment process. While this countercurrent configuration may be preferable in certain examples from an efficiency standpoint, any suitable direction of flow can be used.

The outlet end 156 is connected via a conduit 154 to a pump 152. Pump 152 moves the heat transfer liquid via conduit 150 to a check valve 148, after which it passes through conduit 146 leading to a cooler unit 144. The cooler unit 144 will cool down the heat transfer liquid so that, after it leaves an outlet end 142 and passes through conduit 140, the heat transfer liquid can be reintroduced back into the space 136 via the inlet end 138 to continue the cooling journey. To accommodate the possible need to add extra ammonia into the cellulosic biomass, an optional storage tank of ammonia 172 can be connected to the ammonia reactor 122. The connection may be effected, for example, via a valve 174 connected to the pipe 140 carrying ammonia leading into the reactor body 190.

The dwell time of a given portion of the ammonia-biomass mixture 124 within ammonia reactor 122 may be adjusted to accommodate any of a variety of factors. For example, the length of reactor body 190 and the cross-sectional shapes and areas of the inner conduit 190 and outer jacket 132 will be designed to meet dwell time requirements for the cellulosic biomass to be in contact with the anhydrous ammonia for absorption and adsorption to occur. Factors such as the particle size, shape, moisture content, and composition may influence dwell time. Such factors may contribute to how long it takes for the ammonia to sufficiently permeate the biomass and effect the desired changes to the structure of the biomass. The timing may be dialed in to achieve a desired weaking of the lignocellulosic bonds and hydrogen bonds, such that the biomass becomes softened and pliable. The result is a pliable, ammonia-saturated intermediate product suitable for subsequent processing. For example, this effect may render the biomass more susceptible to densification, reshaping, or other modification so that some components of the cellulosic biomass (e.g., lignin, hemicellulose, or extractives) can be liberated or compressed, as desired.

By way of comparison, if large dimensional pieces of cellulosic biomass, such as 2"×4"×10' sections of lumber are being processed, the dwell time might take longer (e.g., fifteen to twenty minutes). However, the dwell time for small dimensional cellulosic biomass such as sawdust, shavings, chips, shredded fiber or bark, bits, flakes, or pieces of wood or small and highly porous agricultural fibers such as rice hulls, nut shells, rice or wheat straw, bean stalks and shells, or corn stover might be just a few minutes. The larger the cross-sectional area of the inner pipe or conduit 170, the greater the capacity of the pipe to carry the ammonia-biomass mixture 124. So long as the temperature of the ammonia is sufficiently controlled, it may be more practical to measure and meter the gas and liquid and solid blends within the ammonia reactor 122 and to monitor and control the pressure without excessive pressure building up in the ammonia reactor 122. While a single, long ammonia reactor 122 can be used in the processing, it is also possible to sequence together a plurality of ammonia reactors 122 or connected longer lengths of the reactor stations. Such configurations may facilitate varying dwell times or greater capacities, without necessarily slowing down the transit speed of permeation treatment and movement and flow of cellulosic biomass through the lengths of the reactor.

FIG. 3 is shown a cross-sectional view through view lines 3-3 of the ammonia reactor body 190 of FIG. 2, according to one example. In this example, the conduit 170 is shown as having a circular cross-section; and the outer jacket 132 is also shown as having a corresponding circular cross-section. In some instances, conduits with circular cross-sections may provide efficient transfer of fluid and other materials. However, the conduit 170 and its outer jacket 132 could have other cross-sectional shapes than circular. The insulation layer 134 surrounds the outer jacket 132 is shown as being squared off; but again, this view is merely one of many possible shapes which may be determined by various examples, depending on a variety of factors (e.g., the feedstocks being processed, the dimensions and throughput quantity thereof, etc.).

Figure 4:
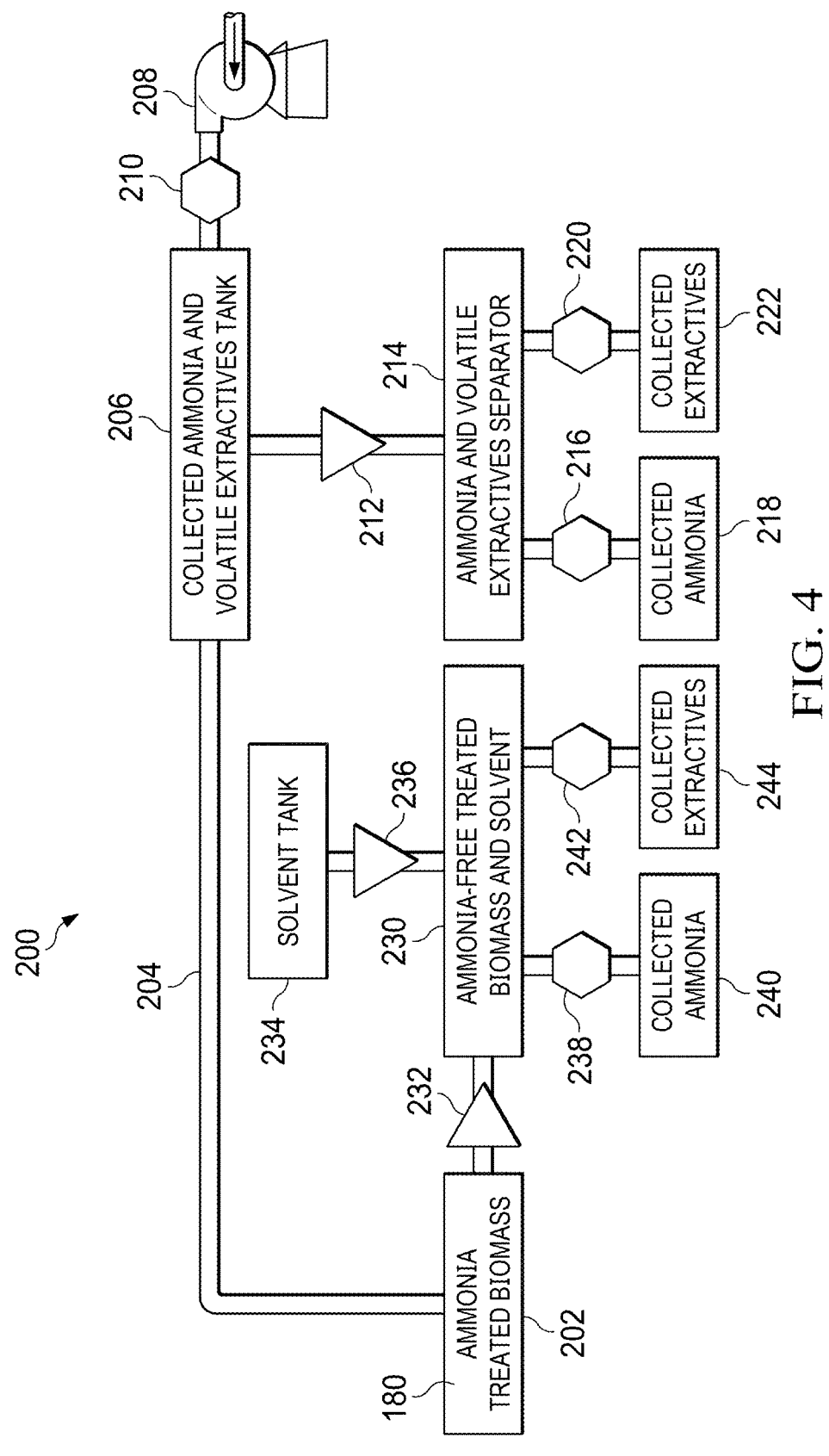
FIG. 4 is a graphical representation of one exemplary embodiment of the process of the invention to remove extractives from the ammonia treated cellulosic biomass.

FIG. 4 is a graphical representation of a system 200 for removing ammonia and extractives from ammonia-treated cellulosic biomass 180, according to one example. In some examples, system 200 is connected to system 100, such that ammonia reactor 122 outputs ammonia-treated cellulosic biomass mixture 180 (e.g., as described with reference to FIGS. 1-3) that is then provided to a primary vessel 202 of system 200.

As shown in FIG. 4, a vacuum pump 208 is connected to tank 202 through a check valve 210. The vacuum pump 208 is configured to draw off ammonia and volatile extractives through a conduit 204 into a collection tank 206. Tank 206 is configured to collect ammonia and volatile extractives from the ammonia-treated biomass 180 (e.g., ammonia gas, water vapor, other moisture, volatile chemicals that evaporate readily, etc.). The contents of tank 206 are transferred via a check valve 212 to a separator 214.

The volatile constituents are separated in separator 214 into recovered ammonia (returned to the process via tank 218) and other extractives (collected in tank 222). Specifically, separator 214 is configured to separate ammonia from the mixture and direct the separated ammonia to a collected ammonia tank 218 through a check valve 216. In addition, separator 214 is configured to separate extractives (e.g., water, inert gases, volatile chemicals, etc.) from the mixture and direct the separated extractives to a separate tank 222 through a check valve 220. Check valves 216 and 220 are used to prevent backflow of the collected materials. Tank 222 may include a membrane filter (not explicitly shown) to selectively extract one or more specific gases (e.g., hydrogen, carbon dioxide, or any other targeted gas or gases).

The collected ammonia can be reused in the processes of the invention; and the collected volatile extractives can be collected and further used as desired. In some examples, the separator 214 may include a series of membrane separators within the unit, each configured to perform the aforementioned separation functions.

Upon the removal of all or a significant portion of ammonia and certain volatile extractives from the ammonia-treated biomass 180, the biomass 180 is transferred via a check value 232 to a secondary tank 230. In this example, tank 230 is configured to extract and isolate from the ammonia-treated biomass certain amounts of residual ammonia or specific chemical compounds. The extraction may be effected using tailored solvents provided by an optional solvent tank 234 via a check valve 236. The residual ammonia is collected in tank 240 and the collected extractives are collected in tank 244. It may be desired that some small element of the ammonia used to impregnate and treat the biomass 180 remains therewithin, which may facilitate further processing, densification, or reshaping of the biomass 180.

The solvent or solution used by solvent tank 234 can be selected based on what particular extractives are desired to be removed from the ammonia-treated biomass, if applicable. For example, if the target extractive is lignin or resins and terpenes, or even tannins, then organic solvents like ethanol, methanol, or acetone, or even hot water can be used. To extract fats and waxes, nonpolar organic solvents like hexane or petroleum ether are useful. Once the extractives are in solution, the extractives can be removed by using known equipment and techniques. This closed loop system 200 can provide a safe, manageable, economical, and environmentally sound processing flow for handling ammonia treated biomass and its removed extractives for a variety of commercial purposes.

In certain applications, it may be desirable to remove or modify lignin as an inherent part of the processing. Such a result may be particularly useful, for example, in the context of high-value biofuels and cellulose-derived products. Converting biomass-derived seeds and fibers into fuels such as biodiesel, ethanol, and sustainable aviation fuel is often more effective when lignin is reduced or structurally modified. However, lignin has historically posed challenges in processing lignocellulosic biomass for applications such as pulp, paper, and corrugated packaging, as it impedes enzymatic access to cellulose. While lignocellulosic feedstocks are abundant, renewable, and low-cost, high lignin content can significantly inhibit the action of cellulase enzymes responsible for hydrolyzing cellulose into fermentable sugars like glucose.

In some examples, a major cause of enzymatic inhibition is addressed by treating the cellulosic biomass 101 with ammonia in the ammonia reactor 122. This ammonia treatment plasticizes the lignin structure without necessarily requiring high heat or complete lignin extraction. Instead, the chemical and physical properties of the biomass are altered through disruption of lignocellulosic and hydrogen bonds, thereby softening and weakening the lignin and enabling it to be flushed out or rendered more compatible with enzymatic activity. This ammonia-based pretreatment enhances lignin-enzyme interactions and allows for deeper cellulase penetration into the biomass, significantly improving enzymatic hydrolysis and glucose yield. In addition to improving access to cellulose, this approach facilitates and mitigates the negative impact of lignin on hemicellulose accessibility, thereby reducing the cost and increasing the efficiency of converting hemicellulose into fermentable sugars—such as xylose and arabinose—for cost-effective bioethanol production.

Furthermore, the treated biomass is rendered more suitable for reshaping, densification, bonding, welding, or repurposing into new geometries and end-use configurations. These transformations support value-added processing and enable cost-effective, high-volume utilization of the biomass, while also reducing undesirable constituents such as air, nitrogen, and moisture, and yielding a denser, more stable, and industrially functional material.

In the process of enzymatic saccharification of lignocellulose, the barrier to effective continuous processing of the feedstocks may be the non-productive adsorption of enzymes into the lignin. This can be caused by the hydrogen bonding, hydrophobic relationship that impedes the saccharification efficiency. Certain examples facilitate pretreatment of the lignin with ammonia in the first stages of processing. Subsequently, as ammonia breaks the hydrogen bonds and softens and erodes the strength of the lignin, the ammonia can be removed by vacuum. A flush can then be applied to the biomass to remove residual lignin from the cellulose. If desired, added chemicals can be introduced to further erode the lignin and flush it from the hemicellulose and cellulose. Thereafter, chemicals such as polyethylene glycol can be used to further reduce the inhibitory effect of lignin allowing for the subsequent introduction of enzymatic laden chemicals in the process to allow for the further pretreatment of the cellulosic biomass. When the enzymes are more able to act on the sugars in the cellulose the biomass has been prepared for more effective sugar conversion and subsequent extraction for the production of bioethanol.

In a similar way, the ammonia treatment disclosed herein can be used to access hemicellulose in plant matter. Hemicellulose in plant matter often contains xylose, which is a five-carbon sugar (a pentose). Hemicellulose is a heteropolymer, meaning it is composed of various types of sugars. Among these, xylose is one of the most prevalent, especially in hardwoods and agricultural crops and plant residues. In hemicellulose, xylose typically forms the backbone of the polymer. The polysaccharide backbone may be branched and may additionally include a variety of monosaccharide residues such as mannose, galactose, rhamnose, and arabinose, as well as uronic acids (e.g., glucuronic and galacturonic acids), contributing to the structural and functional diversity of the biopolymer. The specific composition of hemicellulose, including the proportion of xylose, can vary depending on the type of plant and its part (e.g., stem, leaves, or bark).

Some common agricultural residues that are available in huge quantities in the U.S. and around the world include: corn stover (the leaves, stalks, and cobs remaining after corn is harvested); wheat straw (the dry stalks left over after wheat grains are harvested); rice husks and straw (the protective covering of rice grains (husks) and the dry stalks (straw) which are both rich in hemicellulose and hence xylose); barley straw (similar to wheat straw, barley straw is the dry stalk left after barley grain harvesting); sugarcane bagasse (the fibrous material left after extracting juice from sugarcane); beet mash and plant matter, and soybean stalks and hulls (these are the outer covering of soybean seeds, which are separated during the processing of soybeans).

In the context of biofuel production, xylose is particularly significant. The efficient conversion of xylose to ethanol or other valuable chemicals is a key aspect of utilizing lignocellulosic biomass, as it represents a substantial portion of the fermentable sugars in these materials. However, xylose fermentation is more challenging compared to the fermentation of six-carbon sugars like glucose, which has led to extensive research in developing microorganisms and processes capable of efficiently converting xylose. Despite considerable efforts, it has been quite difficult to find technologies that can quickly and cost-effectively liberate xylose from lignocellulosic biomass.

Upon completion of ammonia treatment to process cellulosic biomass from agricultural residues, hemicellulose (full of xylose) can be washed from the cellulosic biomass. After much of the ammonia is removed, and this xylose can later be used as a feedstock to make ethanol (e.g., by fermentation). Thus, the anhydrous ammonia, ammonia gas and the ammonium hydroxide becomes the solvent that washes out lignin creating the now more prone to be liberated hemicellulose for the production of bioethanol.

At a point in the first reactor stage (e.g., performed within ammonia reactor 122) where the lignin in the cellulosic biomass feedstocks has been subjected to the treatment reaction of ammonia either as a gas or liquid, the biomass can be purged of the fluid or gas by vacuum extraction. The lignin structures may remain saturated and, for a time, can be further processed as desired into a different shape or form, densified, compressed, bound, or welded to other pieces of similarly processed biomass in second processing stages. These second processing stages (e.g., performed at compression station 302 of FIG. 5) provide for mechanical pressure on the biomass to reduce its physical dimensions by at least one half and as much as one fifth or greater of its prior size thereby densifying it substantially and reconfiguring its geometry as desired.

Figures 5, 6:
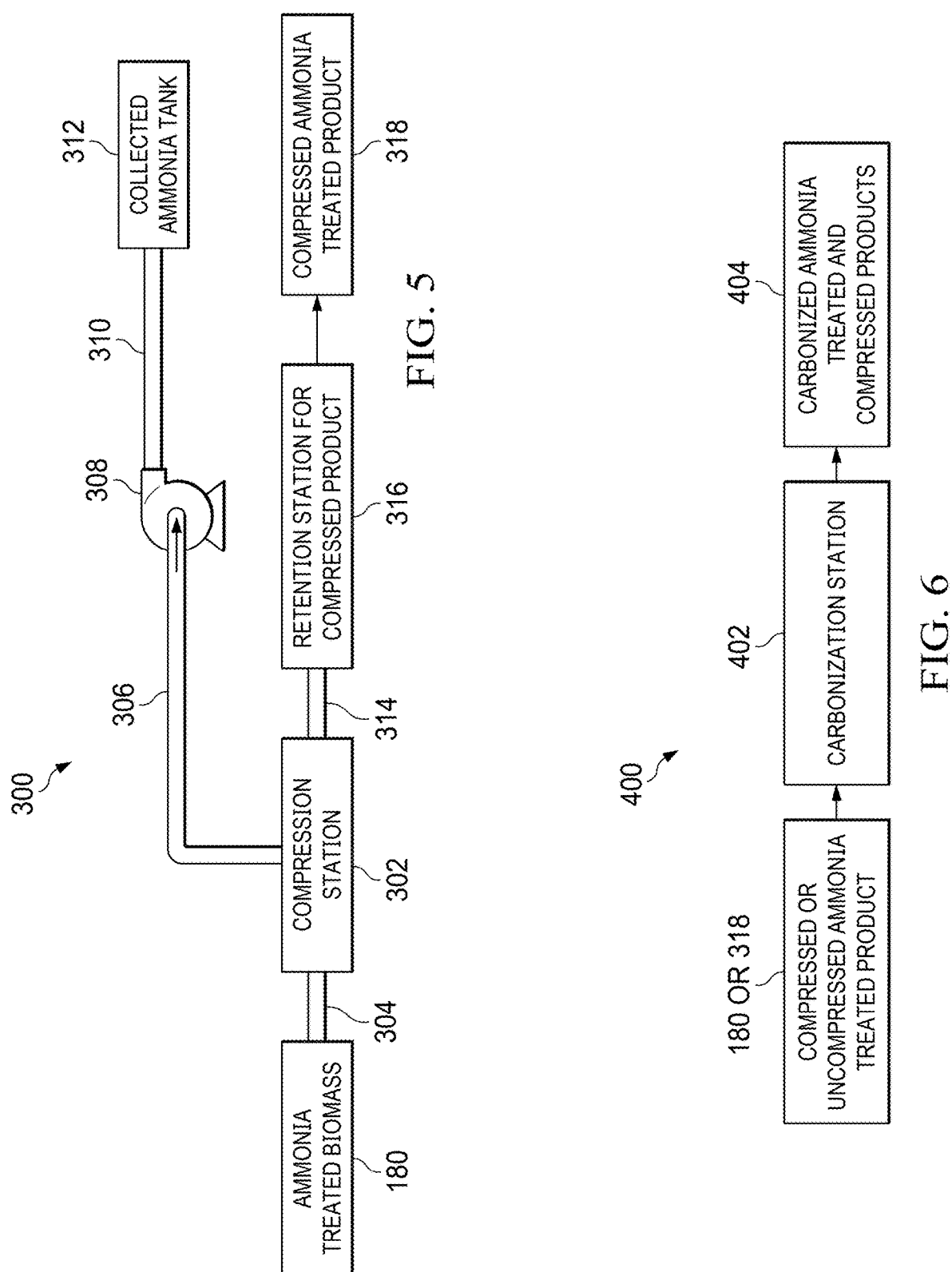
FIG. 5 is a graphical representation of one exemplary embodiment of the process of the invention to compress the ammonia treated biomass into more dense shapes and collect the ammonia.
FIG. 6 is a graphical representation of one exemplary embodiment of the process of the invention to carbonize and/or pyrolyze ammonia heated and compressed biomass made from the other processes of the invention.

Once ammonia-treated and optionally stripped of extractives, the biomass is conveyed to a densification system 300, as described further with reference to FIG. 5.

FIG. 5 is a graphical representation of an example system 300 configured to densify, compress, mold, shape, or imprint the ammonia-treated biomass 180 into new and, in many cases, denser shapes while also enabling collection of ammonia. System 300 may be configured to output the ammonia-treated biomass 180 into a series of repeated shapes. As used herein, the term "repeated shape" refers to a molded or formed output geometry that is produced with substantial consistency across multiple units along a continuous production line, such that each unit exhibits the same or similar dimensions, contours, or configurations as a result of standardized processing.

In some examples, system 300 is used either independently or in conjunction with the system 200 of FIG. 4, depending, for example, on whether extractives have been removed from the ammonia-treated biomass. In some examples, if extractive removal is unnecessary or omitted, system 300 can receive the ammonia-treated biomass 180 directly.

As shown in FIG. 5, the ammonia-treated biomass 180 is passed to a compression station 302 by a mechanical or pneumatic conveyor 304 (e.g., a pipe, conveyor belt, etc.). The compression station 302 may include any suitable machinery for applying targeted compressive force to ammonia-treated biomass 180. For example, compression station 302 may include opposing rollers or moveable platens/plates that apply mechanical pressure to compress and shape the ammonia-treated biomass 180 into dense, structurally stable forms. In other words, the compression processing may not only reshape the biomass 180, but also change its bulk density. The compressed biomass, which has been plasticized due to its prior ammonia treatment, retains the compressed shape without spring-back as lignocellulosic bonds reform during ammonia removal. This configuration can also enable lamination, molding, or binderless consolidation of multiple treated fibers or layers. In some examples, binders are misted into the biomass 180 within the compression station 302 to further add density and strength of the exiting compressed biomass product.

The ammonia-treated biomass 180 may be reshaped—at least in part by compression station 302—into a variety of end products having predetermined sizes and shapes. For example, these end products may include briquets, pellets, tiles, wafers, flakes, pills, or other suitable forms. In some examples, the ammonia-treated biomass 180 is formed into construction materials with standardized dimensions, such as, for example, studs, posts, beams, I-beams, joists, trusses, building panels, and related components, as well as cladding products and materials (e.g., flooring boards and sheets, wall panels, and ceiling panels). The disclosed processing further enables the production of veneers, compressed forms (e.g., pellets, briquettes, lozenges), and densified products with significantly increased material density-often exceeding two to four times the natural density of the original biomass.

If the output material is intended for use in bio-coke production, for example, the ammonia-treated biomass 180 can be compressed by compression station 302 into specially shaped and sized particles suitable for use in smelting applications, such as electric arc furnace (EAF) melting of iron ore or other ores, or in recycled steel production. This process enables the transformation of otherwise low-density biomass into a hard, dense, and renewable alternative to traditional fossil-based anthracitic coke.

System 300 in general, and compression station 302 in particular, may facilitate the use of lower-grade, lower-density wood derived from fast-growing species of softwoods or hardwoods. For example, juvenile wood from species such as *Radiata* pine (*Pinus radiata*, also known as Monterey pine), *Pinus taeda* (Loblolly pine), and *Pinus elliottii* (Slash pine)—collectively referred to as Southern Yellow Pines—is widely cultivated in plantation settings across the globe and represents a major source of renewable softwood. Plantation-grown trees are typically harvested on short rotations, and wood younger than approximately seven to ten years is primarily used for pulp or fiber. During the cultivation cycle, young or undersized trees are selectively removed (thinned) to allow more light and growing space for others. These thinnings, characterized by rapid growth, lower density, and reduced strength, are often left unused or relegated to low-value applications such as bulk cellulosic fiber.

At least half of the juvenile wood harvested is not useable for structural purposes, such as lumber or veneer. *Radiata* pine, for example, does not have the load bearing features of other species such as Douglas Fir. If certain juvenile wood is used directly as structural lumber or in engineered wood products or millwork, it may suffer from defects in cellular structure that cause warping and distortion.

To overcome these and other limitations, the present ammonia-based impregnation and treatment process enables the chemical and physical enhancement of juvenile wood. The processing increases density and mechanical performance, making juvenile wood more comparable to mature wood fiber and thus suitable for structural, engineered, or molded end-use applications that previously required older or higher-quality timber.

Compression station 302 may be configured, for example, to compress pieces of ammonia-treated *Radiata* pine having a cross-sectional area of 3.0"×3.5"×length down 50% to have a cross-sectional area of 1.5"×3.5"×length. Such compression may facilitate making high-strength blanks for finger jointing, or for use as construction studs that are strong, straight, and not prone to warping. A 50% thickness reduction is just one example, and lesser or greater dimension reductions can be made. Indeed, such treated wood can be made into higher grades of lumber products that achieve standards required of prime lumber grades. Other shapes and sizes of final products (e.g., posts, beams, panels, joists, etc.) can be practically and commercially fabricated once subjected to ammonia treatment in combination with densifying compression treatment of compression station 302.

In some embodiments, compression station 302 is configured to compress the ammonia-treated wood into plies or layers for use in manufacturing multi-ply materials and products. When lignin remains in the ammonia-treated wood (i.e., is not removed during processing) these plies can be stacked and compressed together. The result may be high-strength, multi-ply products in which lignin within one discrete wood fiber piece becomes mechanically and chemically bonded to lignin in an adjacent piece, thereby enhancing overall structural integrity. Depending on the degree of compression and density applied to thoroughly impregnated ammonia-treated fiber, the wood pieces may be permanently bonded together without the need for additional adhesives between the discrete plies. This bonding may occur while the ammonia-treated biomass 180 remains pliable, with its lignocellulosic and hydrogen bonds still unset and capable of resetting, prior to the liberation of ammonia. Accordingly, the process enables extensive and practical manipulation of cellulosic biomass for a wide range of applications.

The rollers or platens of the compression station 302 can provide the imprints and molds for the shapes and products to be formed. One unique aspect of the targeted compression of ammonia-treated biomass 180 is that the breakage and reformation of lignocellulosic and hydrogen bonds occur very quickly. Thus, after compression or shaping is complete and the ammonia is liberated from the biomass 180, the newly formed shape and density of the compressed, ammonia-treated product 318 remains intact without spring back to the previous shape and density. The new shape, density, configuration or output product 318 permanently retains its newly intended purposeful shape without memory of what shape or density it once was prior to treatment. Any remaining water and ammonia in the ammonia-treated biomass 180 can be driven out by pressure exerted by compression station 302 or by use of a vacuum pump 308 connected via a conduit 306 to the compression station 302. The ammonia vapor released during compression is pumped using vacuum pump 308, collected via vacuum line 306 and conduit 310, and stored in tank 312 for future use, completing a closed-loop cycle.

A retention station 316 may be used to stabilize the densified products as ammonia fully dissipates and final rigidity is achieved. The retention processing can include, for example, using machinery to maintain the compressed shape of the compressed products for a period of time as the new configuration becomes imbedded in the cellulosic fiber and while the ammonia action on the lignin bounds mitigates. In one example, a large stack of compressed materials (e.g., sheet products) are held together until the lignocellulosic and hydrogen bonds are fully formed, after which the formed product will be completed and can be used without concern that they return to their previously uncompressed shapes and sizes. To avoid possible dangers of ammonia gas coming into contact with people, animals, or the environment, and to ensure full recovery of ammonia, the entire system is preferably enclosed in a sealed environment.

In a particular example, the ammonia-treated biomass 180 input into system 300 of FIG. 5 comprises low-density softwood ground chips and shreds, which retain the lignin-softening effects of ammonia exposure. Compression station 302 may include a shrouded hopper that directs the treated biomass, via an infeed device, into a continuous mechanical compression and densification system comprising opposing rollers or continuous press rollers. In this configuration, the ammonia-treated biomass may be compressed to as little as one-tenth of its original volume. As noted above, ammonia-treated biomass 180—unlike cellulosic biomass treated by other methods—tends not to exhibit spring-back or elastic recovery once compressed.

The opposing rollers enable various shaping operations, including briquetting, granulation, compacting, and the formation of specific geometries as desired. The system may subject the ammonia-treated biomass to high-pressure comminution. The continuous roller press may also be configured to apply misted nano- or micro-sized particulates—such as binders, starches, zeolites, biocarbon, or biochar powders—which help prevent sticking and promote clean release of the compressed biomass from the rollers. The rollers themselves may feature flat surfaces or be specially patterned to produce desired forms, including briquettes, wafers, lozenges, corrugated shapes, or other customized geometries. In an alternative embodiment, opposed compression plates or platens may be used instead of rollers to apply compressive force while the lignin in the biomass remains in a plasticized state.

Compression station 302 may further include a vacuum reactor pump array configured to extract as much liquid and gaseous ammonia as possible, along with any residual gases, after lignin plasticization. The recovered ammonia can then be redirected and reused as part of a continuous recycling program.

The densification techniques and associated processes disclosed herein offer a transformative approach to upgrading a wide range of biomass types, many of which have historically been unsuitable for high-value or structural uses. These processes enable meaningful improvements in material performance, form, and commercial utility, facilitating value-added transformation of underutilized or waste biomass at commercial scale. Moreover, the flexibility of the processing equipment and system configurations described herein allows for processing of diverse feedstocks using varied densification and reshaping strategies, depending on specific application requirements.

The compressed and densified biomass output from system 300 of FIG. 5 may be stockpiled and transported for various downstream applications. In some examples, however, the super-dense biomass may undergo further processing—specifically, carbonization to produce a super-dense biocarbon. This biocarbon may then optionally be subjected to additional heating to convert it into bio-coke, as further described with reference to FIG. 6.

FIG. 6 is a graphical representation of a process 400 for producing carbonized or pyrolyzed ammonia-treated and compressed biomass 404, according to one example. In some examples, the input material may include uncompressed ammonia-treated biomass 180. In some alternative examples, the input material may include compressed, ammonia-treated biomass 318. The selected input material is directed to a carbonization station 402, which may incorporate systems described in the incorporated '459 or '860 patents, both naming the present inventor. In some embodiments, process 400 includes pyrolysis of the compressed biomass 318 in an oxygen-limited environment to yield high-carbon-content products, such as bio-coke, suitable for metallurgical or energy applications. Process parameters may be adjusted to produce a range of carbonized materials with different structural and chemical characteristics.

In instances where bio-coke is produced, it may serve as a green, zero-carbon alternative to conventional coking coal or metallurgical coal in applications such as steelmaking, stainless steel production, or the manufacture of ferro-silicon wafers. This enables the substitution of a sustainable, renewable biomass-derived feedstock for dense fossil-based coking coal in processes such as iron ore smelting for pig iron or the production of silicon alloys. The bio-coke may be produced by subjecting the ammonia-treated biomass (180/ 318) to oxygen-free thermal treatment in carbonization station 402, typically at temperatures ranging from approximately 350° C. to 850° C., depending on the desired material properties and residence time within the reactor. During this process, the biomass may be carbonized to achieve a carbon content of 80-90% or higher. The resulting biocarbon product is green and sustainable and may meet or exceed the thermal and carbon performance characteristics of fossil-based coking coal, making it suitable for use in oxygen-reduction reactions during smelting or as a carburizing agent in secondary metal treatments.

Conventional anthracite and coking coals possess high carbon content and specific structural properties critical for industrial applications. Anthracite coal typically has a carbon content above 85%, low volatility, high density (1.3 to 1.4 g/cm$^3$), and is used for heating and metallurgy due to its clean-burning characteristics. Coking coal, a type of bituminous coal, is valued for its ability to form porous, strong coke through high-temperature carbonization. It generally has lower density than anthracite and must meet stringent criteria including caking ability, appropriate volatile matter levels, and low ash and sulfur content.

Using ammonia-infused, lignin-plasticized biomass, such as hardwoods or softwoods, and densifying it by a factor of two to four times its original density, facilitates the production of a high-performance green bio-coke that can rival or surpass fossil anthracite and coking coals. Example feedstocks include bamboo (0.54-0.78 g/cm$^3$), oak (0.6-0.9 g/cm$^3$), Southern Yellow Pine (0.42 g/cm$^3$), European Pine (0.64 g/cm$^3$), birch (0.42 g/cm$^3$), and lignin itself (1.35-1.5 g/cm$^3$). Lignin, when combined with cellulosic biomass, can act as a binder during compression, facilitating the formation of uniform, shape-stable structures that are well-suited for carbonization. The mechanical densification, coupled with ammonia treatment, enables shaping into uniform geometries optimized for smelter compatibility, overcoming the irregularity issues typical of fossil coke.

The densified biomass may undergo primary carbonization using ammonia-based processes, as described in the inventor's incorporated '459 and '860 patents. This initial treatment may yield bio-carbon with high fixed carbon content and minimal volatile matter. Optionally, a second mechanical densification and shaping step may be applied after carbonization to further enhance physical form and pre-coked density. High-quality coking coal must exhibit excellent caking ability, low ash, and low sulfur content. The disclosed bio-coke process meets or exceeds these standards due to the characteristics of biomass feedstocks and the ammonia-based transformation process.

Plant-derived biomass is inherently low in sulfur, and bio-coke produced by the disclosed process similarly exhibits negligible sulfur levels, thereby avoiding sulfur dioxide emissions and improving steel quality. The process also allows for engineering the volatile matter content to ideal ranges (approximately 20-26%) suitable for coking applications. Volatile organic compounds (VOCs) are substantially removed during the initial carbonization, resulting in a stable, high-performance product suitable for blast furnaces and electric arc furnaces (EAFs).

The disclosed process further supports tailoring of bio-coke to exhibit key metallurgical properties. These include retention of controlled residual ammonia to enhance reduction reactions, engineered plasticity to enable proper swelling and res-solidification under heat, and optimized strength and hardness to withstand high furnace loads. Low phosphorus content can also be achieved through feedstock selection, reducing impurities that compromise steelmaking efficiency.

Compared to fossil-derived coke, which varies in shape, density, and composition, the example bio-coke process provides uniformity, predictability, and enhanced mechanical performance. Moisture levels are reduced to below 10%, improving heating value and transport efficiency. As a result, the ammonia-based densification and carbonization of ligno-cellulosic biomass yields a high-quality, sustainable bio-coke with consistent properties suitable for a wide range of industrial applications-offering a compelling, renewable alternative to traditional fossil fuels.

Together, the potentially combinable systems and corresponding processing described with reference to FIGS. 1-6 facilitate high-throughput, scalable, and environmentally responsible transformation of diverse biomass types into densified, structurally reformed, or chemically modified intermediates and end products. The modular system design supports adaptation to a wide range of biomass sources, such as, for example, water-laden invasive plants, softwoods, agricultural waste, and biomass containing plant pathogens (e.g., molds) or pests (e.g., nematodes). In certain examples, the systems enable rapid, cost-effective, and environmentally responsible alteration of biomass structure to support reshaping, densification, and downstream utilization. The treatment process is designed to operate at commercial throughput levels exceeding ten tons per hour and facilitates multiple beneficial transformations, including moisture and gas removal, plasticization of lignin, and the reduction of cellulosic moisture content to less than half of the starting level. The processing can also be configured to a significant portion (e.g., more than half) of the starting moisture and oxygen/air content typically present in unprocessed biomass, while minimizing waste and air entrainment during operation. In addition, ammonia-based processing provides enhanced enzymatic access for biofuel production, value-added extractive recovery, and the formation of moldable bio-based construction and industrial materials.

The disclosed ammonia-based treatment and densification process enables a transformative approach to valorizing underutilized cellulosic biomass. By converting low-density biomass into a carbonized material with significantly higher post-treatment density—often exceeding that of fossil coal—the process yields a cost-effective, scalable, and environmentally sustainable substitute for traditional metallurgical coke. The densified and reshaped product exhibits regular and uniform geometries optimized for smelting or reactor compatibility. Unlike conventional coal or coke, which varies in size and density, the ammonia-treated and carbonized biomass achieves a consistent physical and chemical profile, including increased strength, fixed carbon content, and improved handling characteristics.

Some examples facilitate chemical and physical modification of cellulosic biomass feedstocks. This enables the material to be densified, reshaped, compressed, or otherwise formed into more compact, uniform configurations that facilitate handling, storage, transport, and further use at a greater cellular density than the initial feedstock density. The densification effect may provide several intrinsic advantages including, for example, enhancing mechanical strength and structural integrity of the treated biomass, while also improving resistance to fire, insects, and microbial degradation due to the reduction of porosity and the chemical modifications induced during processing. The ability to achieve enhanced bulk and cellular density is particularly beneficial given the typically low and inconsistent natural density of raw biomass materials. For example, it may be desirable to achieve a greater bulk density than otherwise could be possible due to the random shape of the feedstocks at their varying degrees of aggregation, whether as straw, chunks, chips, logging slash, sawdust, hog fuel and the like.

Certain examples facilitate use of a wide range of cellulosic biomass for feedstock for forming structural materials and for advanced feedstock for other industrial processes and products having improved strength or density, durability, and waterproofing or water repellent, anti-infestation, and fire-retardant properties.

Some examples achieve output product having increased cellular density, uniformity, strength and reduced bulk. This may be effected through high-speed processing having rates in excess of ten tons per hour per production unit. In addition, the processing may be cost effective with more process control automation, lower machinery fabrication and maintenance cost and fewer moving parts. The output product may be durable, consistent, uniform, and remain true to its output shape, density and form. These example advantageous aspects, among others, may tend to reduce further processing and handling costs and thereby improve the quality of the feedstock for whatever purpose was desired.

Certain examples may control the management and function of the lignocellulosic bonds in biomass. These aspects may broaden the purpose and use of certain abundant feedstocks, while achieving desired product output via a cost effective and practical production process. In addition, the output may provide higher value relative to starting feedstock, such as by producing renewable diesel, sustainable airline fuel, hydrogen fuel, dimethyl ether fuel or bioethanol, where lignin has been a negative impacting element in the biomass conversion and processing.

Conventional methods of softening wood—such as exposure to heat and moisture (e.g., steam)—can sufficiently modify lignin to permit densification, bending, or veneering of solid wood. However, such methods are generally unsuitable for heterogeneous or low-value biomass materials intended for conversion into biofuels, biochemicals, or structural composites. In contrast, immersing bulk cellulosic biomass in ammonia, as disclosed herein, can permeate the cellular structure of the biomass. This can induce a thermoplastic transformation of lignin, which is the natural binder in lignocellulosic materials. This transformation is achieved more effectively and durably than by traditional heat- or steam-based methods, particularly for heterogeneous or low-value biomass materials.

Ammonia can be dangerous and toxic if improperly used or exposed to persons in an unprotected and unsafe manner. The broader use of ammonia in agriculture and industry has been the result of extensive health and safety precautions for use in normal industrial and farming situations. Ammonia in water is a consumer product often used for cleaning. Even household use of consumer product ammonia can be problematic if safety precautions are not taken. Household ammonia for example, mixed with bleach is toxic and can produce a chlorine gas that will injure living things. So, the use and application of ammonia according to the teachings of the present disclosure is taken with an abundance of caution and deliberate concern for the potential of misuse and improper application. Consequently, the configuration of storage, tanks, pipes, pumps, vents and vacuums, metals used and potential for corrosion or failure of gaskets, joints, valves, presses motors, bearings and the like and the management of both the liquid and gaseous ammonia are the result of engineered safety considerations by skilled and knowledgeable engineering expertise for use through the reactor and in the densification process and thereafter.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. To aid the Patent Office, and any readers of any patent issued on this application, in interpreting the claims appended hereto, applicant notes that there is no intention that any of the appended claims invoke 35 U.S.C. § 112 (f) as it exists on the date of filing hereof unless the words "means for" or "step for" are explicitly used in the claim language.

In this disclosure, a device that is "configured to" perform a task or function may be configured at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Also, in this description, the recitation "based on" means "based at least in part on." Therefore, if X is based on Y, then X may be a function of Y and any number of other factors. Unless otherwise stated, "about," "approximately" or "substantially" preceding a parameter means being within +/−10 percent of that parameter or, if the parameter is zero, a reasonable range of values around zero.

In the foregoing descriptions, for purposes of explanation, numerous specific details are set forth to provide a thorough understanding of one or more examples. However, this disclosure may be practiced without some or all these specific details, as will be evident to one having ordinary skill in the art. In other instances, well-known process steps or structures have not been described in detail in order not to unnecessarily obscure this disclosure. In addition, the foregoing description is not intended to limit the disclosure to the described examples. To the contrary, other examples are possible, and the description is intended to cover alternatives, modifications, and equivalents of the described examples, as may be included within the spirit and scope of the disclosure as defined by the appended claims.

What is claimed is:

1. A method comprising:

plasticizing at least a portion of lignin within a lignocellulosic biomass by mixing the biomass with anhydrous ammonia at a sub-ambient temperature and continuously conveying the mixture of lignocellulosic biomass and ammonia through a reactor;

removing at least a portion of the ammonia from the mixture;

molding the lignocellulosic biomass having plasticized lignin into a repeated shape; and increasing a fixed carbon fraction of the molded lignocellulosic biomass by subjecting the biomass to thermal treatment at a temperature between 350° C. and 850° C.

2. The method of claim 1, wherein the thermal treatment carbonizes the lignocellulosic biomass into a high-carbon-content bio-coke.

3. The method of claim 2, wherein the bio-coke has a fixed carbon content of at least 80%, contains less than 0.5% sulfur by weight, and has a volatile matter content between 20% and 26% on a dry, ash-free basis.

4. The method of claim 2, further comprising densifying the bio-coke by applying a compressive force thereto.

5. The method of claim 1, wherein at least respective portions of the removing and molding occur concurrently.

6. The method of claim 1, wherein the molding includes:

placing a first piece of the lignocellulosic biomass having plasticized lignin in contact with a second piece of the lignocellulosic biomass having plasticized lignin; and applying compressive force across an interface between the first and second pieces to join the pieces together into a fused structure.

7. The method of claim 6, wherein the fused structure comprises a construction material selected from the group consisting of: beam, joist, panel, plank, post, and tile.

8. The method of claim 1, wherein the molding includes densifying the lignocellulosic biomass having plasticized lignin by applying a compressive force thereto.

9. The method of claim 1, wherein the removing includes subjecting the ammonia to evaporation and vapor-phase extraction.

10. The method of claim 1, wherein the anhydrous ammonia is in a liquid or gaseous form.

11. The method of claim 1, wherein the lignocellulosic biomass comprises a heterogeneous mixture of feedstocks sourced from a plurality of different biomass types.

12. The method of claim 1, wherein the lignocellulosic biomass includes one or more of hemicellulose, lignin, and cellulose.

13. The method of claim 1, wherein the lignocellulosic biomass includes biologically active contaminants selected from the group consisting of mold, fungal pathogens, insect larvae, nematodes, and microbial pests.

14. The method of claim 1, wherein the repeated shape conforms to standardized construction material selected from the group consisting of: stud, post, beam, I-beam, joist, truss, plywood veneer, plywood, wafer wood building panel, furniture substrate panel, cladding, flooring, wall covering, siding, and ceiling panel.

15. The method of claim 1, wherein the repeated shape is one or more of: briquette, pellet, wafer, tile, flake, pill, and molded block.

16. The method of claim 1, wherein the repeated shape is configured to be stackable.

17. The method of claim 1, further comprising circulating a cold heat-transfer fluid around, but not in contact with, the mixture of lignocellulosic biomass and ammonia.

18. The method of claim 17, further comprising recycling at least a portion of the removed ammonia into the cold heat-transfer fluid.

19. The method of claim 1, further comprising recycling at least a portion of the removed ammonia for use in treating additional lignocellulosic biomass.

20. The method of claim 1, further comprising recovering an organic extractive from the lignocellulosic biomass having plasticized lignin.

21. The method of claim 20, wherein the organic extractive is selected from the group consisting of: biofuel precursors, including glycerin, sugar, fatty acid, alcohol, and sterol; structural or adhesive compounds, including wax, resin, lignin, and tannin; and volatile organic compounds, including terpene, aldehyde, ketone, and pitch.

22. The method of claim 1, wherein removing at least a portion of the ammonia from the mixture includes removing ammonia and a volatile extractive; and further comprising separating the removed portion of the ammonia from the volatile extractive.

* * * * *